(12) United States Patent
Yokoo et al.

(10) Patent No.: US 12,252,037 B2
(45) Date of Patent: Mar. 18, 2025

(54) DUAL BATTERY FUEL CELL SYSTEM

(71) Applicant: TOYOTA MOTOR ENGINEERING & MANUFACTURING NORTH AMERICA, INC., Plano, TX (US)

(72) Inventors: Takehito Yokoo, Aliso Viejo, CA (US); Wen Li, Plano, TX (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 140 days.

(21) Appl. No.: 17/230,839

(22) Filed: Apr. 14, 2021

(65) Prior Publication Data
US 2022/0340048 A1    Oct. 27, 2022

(51) Int. Cl.
B60L 58/40 (2019.01)
B60L 50/72 (2019.01)
H01M 8/04858 (2016.01)
H01M 16/00 (2006.01)

(52) U.S. Cl.
CPC ........... B60L 58/40 (2019.02); B60L 50/72 (2019.02); H01M 8/0494 (2013.01); H01M 16/006 (2013.01); H01M 2250/20 (2013.01)

(58) Field of Classification Search
CPC ...... B60L 58/40; B60L 50/72; H01M 8/0494; H01M 16/006; H01M 2250/20
See application file for complete search history.

(56) References Cited

U.S. PATENT DOCUMENTS

| | | | |
|---|---|---|---|
| 7,932,634 B2 | 4/2011 | Bourilkov | |
| 8,121,748 B2 | 2/2012 | Jeon | |
| 10,000,141 B2 | 6/2018 | Lee | |
| 2003/0194586 A1* | 10/2003 | Sugiura | H01M 8/04955 |
| | | | 429/513 |
| 2004/0145338 A1 | 7/2004 | Nakamura | |

(Continued)

FOREIGN PATENT DOCUMENTS

| | | |
|---|---|---|
| CN | 102555765 | 7/2012 |
| JP | 11332023 | 11/1999 |
| WO | 2019126802 | 6/2019 |

OTHER PUBLICATIONS

Bhat et al., "Energy Harvesting Communications Using Dual Alternating Batteries," IEEE, Dec. 18, 2018, pp. 1-30, 2018; arXiv:1801.03813v3 [cs.IT] Dec. 18, 2018.

(Continued)

*Primary Examiner* — Adam A Arciero
(74) *Attorney, Agent, or Firm* — SHEPPARD, MULLIN, RICHTER & HAMPTON LLP; Daniel N. Yannuzzi

(57) ABSTRACT

A dual-battery fuel cell system is provided, including two supplemental batteries, each battery supporting/supplementing operation of a fuel cell stack in the system. Driving conditions associated with a fuel cell vehicle can be obtained. Based on the driving conditions, power sources of the fuel cell vehicle to provide power to fuel cell vehicle system can be determined, the power sources comprising the fuel cell stack and the two supplemental batteries. Operating conditions of each of the power sources can be assessed, and one or more of the power sources can be controlled to deliver power to the fuel cell vehicle system based on the operating conditions of each of the power sources.

20 Claims, 7 Drawing Sheets

(56) References Cited

U.S. PATENT DOCUMENTS

| | | | |
|---|---|---|---|
| 2006/0071630 A1* | 4/2006 | Dame | B60L 58/33 |
| | | | 320/104 |
| 2009/0223726 A1 | 9/2009 | Jeon, II | |
| 2009/0309416 A1* | 12/2009 | Bose | B60W 10/26 |
| | | | 307/9.1 |
| 2010/0136451 A1 | 6/2010 | Imanishi | |
| 2015/0214770 A1 | 7/2015 | Chen | |
| 2018/0334158 A1 | 11/2018 | Chen | |
| 2018/0354373 A1* | 12/2018 | Kusch | H02J 7/0013 |
| 2019/0207180 A1* | 7/2019 | Richter | B60L 50/64 |
| 2020/0130518 A1 | 4/2020 | Kusch | |
| 2020/0164766 A1* | 5/2020 | Tanaka | H01M 8/04 |
| 2020/0398658 A1 | 12/2020 | Li | |

OTHER PUBLICATIONS

Fletcher et al., "The Effect of Fuel Cell and Battery Size on Efficiency and Cell Lifetime for an L7e Fuel Cell Hybrid Vehicle," Nov. 11, 2020, Energies 2020, vol. 13, issue 22.

GE News, "GE Demonstrates Battery Dominant Fuel Cell Bus Using New Durathon™ Battery", Press Release, Dec. 13, 2012; https://www.ge.com/news/press-releases/ge-demonstrates-battery-dominant-fuel-cell-bus-using-new-durathon%E2%84%A2-battery.

Hwang et al., "A Novel Range-Extended Strategy for Fuel Cell/Battery Electric Vehicles," The Scientific World Journal, vol. 2015, article ID 363094, Dec. 7, 2014.

International Search Report & Written Opinion mailed Aug. 9, 2022, in International Application No. PCT/US2022/024780, Authorized Officer Hye Lyun Park.

* cited by examiner

DUAL BATTERY FUEL CELL SYSTEM

TECHNICAL FIELD

The present disclosure relates generally to vehicle fuel cell systems, and more particularly, to a dual battery fuel cell system, where a first battery may be more energy dense, and where a second battery may be more power dense to address different supplemental load requests.

DESCRIPTION OF RELATED ART

Many vehicles are electric/electrified vehicles or, in other words, vehicles that have an electrified powertrain. The typical electrified vehicle has a more or less traditional drivetrain that includes one or more wheels, as well as a transmission, a differential, a drive shaft and the like, to which the wheels are mechanically connected. However, in place of an engine, the electrified vehicle includes one or more motors/motor-generators. As part of the electrified powertrain, the drivetrain is mechanically connected to the one or more motors/motor-generators. In conjunction with the drivetrain, the motors/motor-generators are operable to power the wheels using electrical energy. More and more such electrified vehicles are fuel cell vehicles (FCVs), or electrified vehicles that include one or more fuel cell stacks. In FCVs, the fuel cell stacks are operable to generate the electrical energy used by the motors/motor-generators to power the wheels.

BRIEF SUMMARY OF THE DISCLOSURE

In accordance with one embodiment, a fuel cell vehicle may comprise a processor, and a memory unit operatively connected to the processor. The memory unit includes computer code that when executed causes the processor to obtain driving conditions associated with the fuel cell vehicle; based on the driving conditions, determine which power sources of the fuel cell vehicle are considered to provide power to an fuel cell vehicle system, the power sources comprising a fuel cell stack and two supplemental batteries; and assess operating conditions of each of the power sources and control one or more of the power sources to deliver power to the fuel cell vehicle system based on the operating conditions of each of the power sources.

In some embodiments, the driving conditions comprise one or more operating characteristics of the fuel cell vehicle and environmental characteristics of a path being traversed by the fuel cell vehicle.

In some embodiments, the operating conditions of each of the power sources comprise one or more of available energy for discharge to the fuel cell vehicle system, and operating parameters of each of the power sources, In some embodiments, the power sources comprise a fuel cell stack, a first supplemental battery, and a second supplemental battery. In some embodiments, the fuel cell stack comprises a primary power source of the fuel cell vehicle system. In some embodiments, the first supplemental battery comprises a power dense battery pack, and wherein the second supplemental battery comprises an energy dense battery pack. In some embodiments, the computer code that when executed causes the processor to determine which power sources are considered further causes the processor to access a driving condition-to-power source mapping to identify which of the power sources are to be considered. In some embodiments, the driving condition-to-power source mapping is based on energy dense-specific or power dense-specific needs of the fuel cell vehicle system.

In some embodiments, each of the two supplemental batteries discharge respectively stored energy to supplement deficient energy provided by the fuel cell stack to meet a requested fuel cell vehicle system demand.

In some embodiments, each of the power sources discharge respectively stored energy to recharge another of the power sources.

In some embodiments, the fuel cell vehicle system comprises one or more of a propulsion system and an auxiliary system.

In some embodiments, each of the two supplemental batteries are recharged via at least one of regenerative braking performed by the fuel cell vehicle and plugin charging.

In accordance with another embodiment, a fuel cell system of a fuel cell vehicle, comprises: a fuel cell stack; a first battery configured to supplement the fuel stack for a power-dense fuel cell vehicle system demand; a second battery configured to supplement the fuel stack for an energy-dense fuel cell vehicle system demand; and a control circuit adapted to control operation of the first and second batteries in accordance with driving conditions impacting the fuel cell vehicle and operating conditions of the fuel cell stack and the first and second batteries.

In some embodiments, the driving conditions comprise one or more operating characteristics of the fuel cell vehicle and environmental characteristics of a path being traversed by the fuel cell vehicle.

In some embodiments, the operating conditions of the fuel cell stack and the first and second batteries comprise one or more of available energy for discharge to a fuel cell vehicle system, and operating parameters of each of the fuel cell stack and the first and second batteries.

In some embodiments, the driving conditions are mapped to usage of one or more of the first and second batteries based on optimal energy discharge corresponding to each of the mapped driving conditions. In some embodiments, the optimal energy discharge is based on energy dense-specific or power dense-specific needs of a fuel cell vehicle system.

In some embodiments, the fuel cell vehicle system comprises one or more of a propulsion system and an auxiliary system.

In some embodiments, each of the first and second batteries discharge respectively stored energy to supplement deficient energy provided by the fuel cell stack to meet a requested fuel cell vehicle system demand.

In some embodiments, each of the first and second batteries are recharged via at least one of regenerative braking performed by the fuel cell vehicle and plugin charging.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
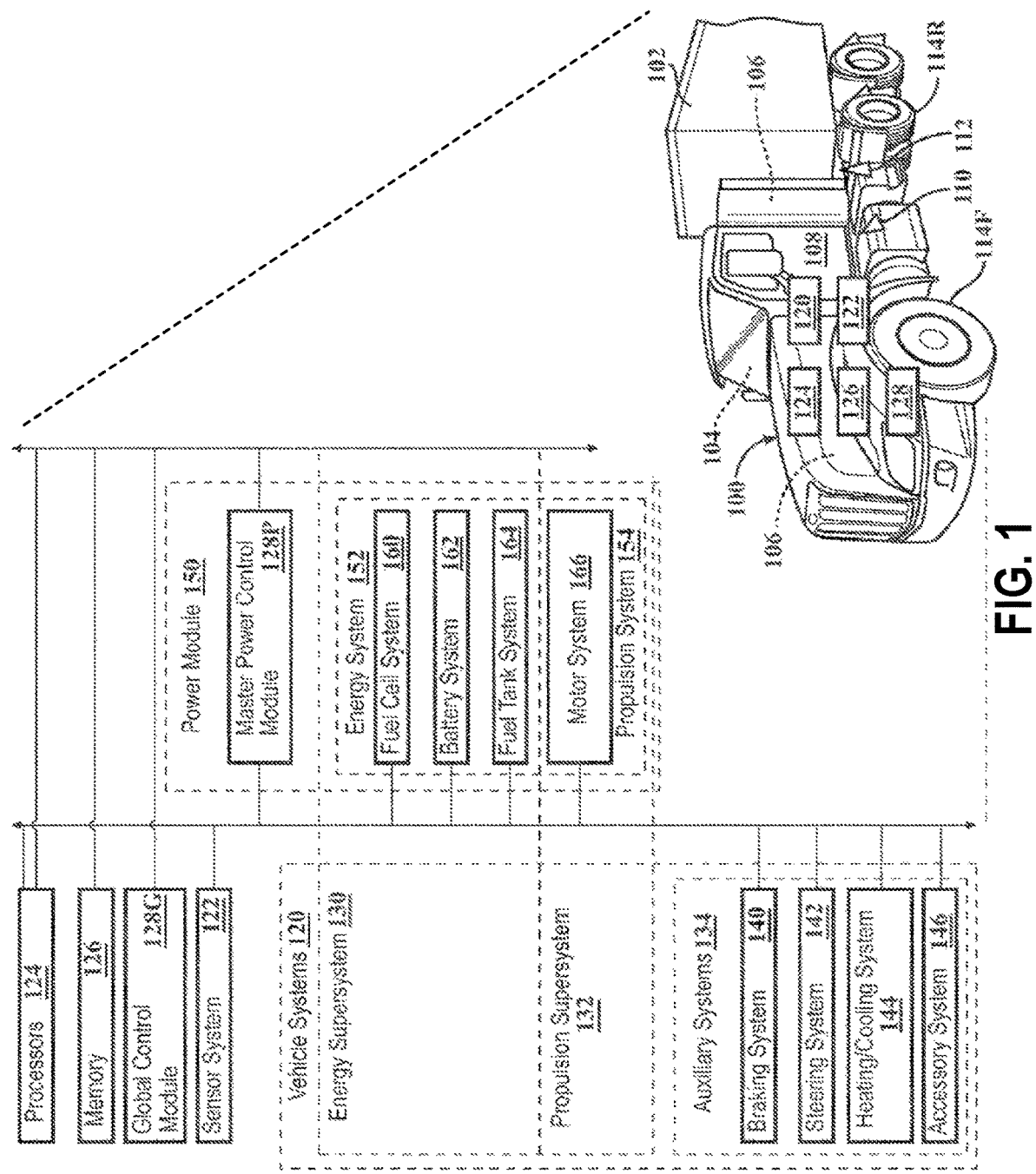
FIG. 1 illustrates an example fuel cell vehicle.

The figures are not exhaustive and do not limit the present disclosure to the precise form disclosed.

DETAILED DESCRIPTION

As noted above, fuel cell vehicles (FCVs) may include one or more fuel cell stacks that are operable to generate the electrical energy used by motors/motor-generators to power the wheels of such FCVs. Typically, a battery pack is associated with a fuel cell stack, where the fuel cell stack is more energy dense, while the typical battery used in FCVs supplement more power to the fuel cell system. Energy refers to a capacity to do work, while power is the rate at which work is done. In other words, energy is power integrated over time, and power is the rate at which energy is transmitted. Energy density typically refers to how much energy can be stored, while power density typically refers to how quickly stored energy can be released. A higher energy density generally results in the ability to store larger amounts of energy, while a high power density generally results in the ability to release higher amounts of energy more quickly. From a battery perspective, if there are two batteries in a system, the one with higher power density and lower energy density can be referred to as a "power battery" in the system. On the other hand, the one with lower power density and higher energy density can be referred to as an "energy battery" in the system. More specifically, the "power battery" carries less energy, but can provide higher power when the system needs high power. The "energy battery" carries more energy, and acts as an energy reservoir and a power supplement.

Depending on the energy/power requests from an FCV, the battery/battery pack may not sufficiently meet the energy/power request, e.g., the single battery may not be able to provide the requisite energy to propel the FCV in accordance with a desired level of acceleration. Additionally, single battery configurations, where the single battery is more power dense, can result in the single battery "dumping" its stored energy quickly, with nothing left in reserve, and in some instances, the single battery must handle both immediate/high-power-draw requests, as well as long-term/continuous/low-power draw requests. Again, this can lead to insufficient energy needed to meet an operational demand(s) of the FCV, and can also result in premature degradation/reduced life of the battery.

In accordance with various embodiments, a dual battery configuration is implemented relative to any one fuel cell/fuel cell stack, where one battery may be more energy dense, and where the other battery may be more power dense. In this way, different types of energy/power needs can be met by a battery configured to address those different needs appropriately. That is, power can be distributed from/by each of a fuel cell, first battery, and second battery according to triggers/indicators characterizing a particular driving condition or set of conditions, such as but not limited to, grade, rate of acceleration, and so on, as well as, e.g., the operating condition(s) (for example, battery state of charge (SOC), power range boundaries, temperatures, etc.) of one or both batteries.

An FCV 100 is shown in FIG. 1 as a representative electrified vehicle. In this description, uses of "front," "forward" and the like, and uses of "rear," "rearward" and the like, refer to the longitudinal directions of the FCV 100. "Front," "forward" and the like refer to the front (fore) of the FCV 100, while "rear," "rearward" and the like refer to the back (aft) of the FCV 100. Uses of "side," "sideways," "transverse" and the like refer to the lateral directions of the FCV 100, with "driver's side" and the like referring to the left side of the FCV 100, and "passenger side" and the like referring to the right side of the FCV 100.

In FIG. 1, the FCV 100 is shown to be a semi-tractor or, in other words, a tractor unit that, together with a hitched semitrailer 102, forms a semi-truck. The FCV 100 has an exterior and a number of interior compartments. The compartments include a passenger compartment 104 and one or more engine compartments 106. The FCV 100 may include, among other things, seats and a dash assembly housed in its passenger compartment 104.

The FCV 100 has a body 108 that forms its exterior and defines its compartments. The body 108 has upright sides, a floor, a front end, a rear end, a roof and the like. In the semi-truck to which the FCV 100 belongs, the semitrailer 102 similarly has an exterior and, as an interior compartment, a cargo compartment for carrying cargo. In addition to the body 108, the FCV 100 has a chassis 110. The chassis 110 serves as an underbody for the FCV 100. The chassis 110, like the body 108, forms the exterior of the FCV 100. As part of the chassis 110, the FCV 100 includes a hitch 112 for hitching the semitrailer 102 to the FCV 100. With the semitrailer 102 hitched to the FCV 100, the FCV 100 is operable to pull the semitrailer 102 and any onboard cargo.

The FCV 100 has a drivetrain. The drivetrain is part of, mounted to or otherwise supported by the chassis 110. The drivetrain may be housed, in whole or in part, in any combination of the passenger compartment 104, the engine compartments 106 or elsewhere in the FCV 100. As part of the drivetrain, the FCV 100 includes wheels 114. The wheels 114 support the remainder of the FCV 100 on the ground. The FCV 100 includes ten wheels 114, two of which are front wheels 114F, and eight of which are rear wheels 114R. The rear wheels 114R are arranged in four dual-wheel setups. The rear wheels 114R belonging to two driver's side dual-wheel setups are shown, with the other two, passenger side dual-wheel setups being mirror images that include the remaining rear wheels 114R. One, some or all of the wheels 114 are powered to drive the FCV 100 along the ground. In a rear-wheel drive arrangement, one, some or all of the rear wheels 114R are powered to drive the FCV 100 along the ground. For this purpose, also as part of the drivetrain, in addition to the wheels 114, the FCV 100 includes any penultimate combination of a transmission, a differential, a drive shaft and the like, to which the wheels 114 are mechanically connected. It should be understood that various embodiments may be implemented in other types of FCVs, e.g., passenger FCVs that may similar or non-similar components/aspects as those described above in the context of an FCV semi-tractor.

The FCV 100 operates as an assembly of interconnected items that equip the FCV 100 to satisfy real-time vehicle demands. Generally speaking, a vehicle demand corresponds to a vehicle function whose performance satisfies the vehicle demand. Accordingly, the FCV 100 is equipped, in operation, to satisfy one or more vehicle demands by performing one or more corresponding vehicle functions. With respect to performing vehicle functions, the FCV 100 is subject to any combination of manual operation and autonomous operation. In the case of manual operation, the FCV 100 may be manual-only. In the case of autonomous operation, the FCV 100 may be semi-autonomous, highly-autonomous or fully-autonomous.

For purposes of satisfying vehicle demands, the FCV 100 includes one or more vehicle systems 120. Either alone or in conjunction with the drivetrain, the vehicle systems 120 are operable to perform vehicle functions on behalf of the FCV 100, and thereby satisfy corresponding vehicle demands on behalf of the FCV 100. Any combination of the vehicle systems 120 may be operable to perform a vehicle function. Accordingly, from the perspective of a vehicle function, as well as a corresponding vehicle demand, one, some or all of the vehicle systems 120 serve as associated vehicle systems 120. Moreover, each vehicle system 120 may be operable to perform any combination of vehicle functions, and thereby satisfy any combination of corresponding vehicle demands, in whole or in part. Accordingly, each vehicle system 120, from its own perspective, serves as an associated vehicle system 120 for one or more vehicle functions, as well as one or more corresponding vehicle demands.

In addition to the vehicle systems 120, the FCV 100 includes a sensor system 122, as well as one or more processors 124, memory 126, and one or more control modules 128 to which the vehicle systems 120 and the sensor system 122 are communicatively connected. The sensor system 122 is operable to detect information about the FCV 100. The processors 124, the memory 126 and the control modules 128 together serve as one or more computing devices whose control modules 128 are employable to orchestrate the operation of the FCV 100.

Specifically, the control modules 128 operate the vehicle systems 120 based on information about the FCV 100. Accordingly, as a prerequisite to operating the vehicle systems 120, the control modules 128 gather information about the FCV 100, including any combination of the information about the FCV 100 detected by the sensor system 122 and information about the FCV 100 communicated between the control modules 128. The control modules 128 then evaluate the information about the FCV 100, and operate the vehicle systems 120 based on their evaluation. As part of their evaluation of the information about the FCV 100, the control modules 128 identify one or more vehicle demands. Relatedly, as part of their operation of the vehicle systems 120, when a vehicle demand is identified, the control modules 128 operate one or more associated vehicle systems 120 to satisfy the vehicle demand, while maintaining the fuel cell and batteries within their operative range with respect to SOC, power, temperature, etc). For example, actuation of an accelerator pedal of FCV 100 results in a request for some particular, desired amount of torque to be applied to wheels 114 vis-à-vis energy system 152 providing energy to propulsion system 154 to drive wheels 114 (described in greater detail below).

Vehicle Systems

The vehicle systems 120 are part of, mounted to or otherwise supported by the chassis 110. The vehicle systems 120 may be housed, in whole or in part, in any combination of the passenger compartment 104, the engine compartments 106 or elsewhere in the FCV 100. Each vehicle system 120 includes one or more vehicle elements. On behalf of the vehicle system 120 to which it belongs, each vehicle element is operable to perform, in whole or in part, any combination of vehicle functions with which the vehicle system 120 is associated. It will be understood that the vehicle elements, as well as the vehicle systems 120 to which they belong, may but need not be mutually distinct.

The vehicle systems 120 include an energy supersystem 130 and a propulsion supersystem 132. The energy supersystem 130 and the propulsion supersystem 132 are electrically connected to one another. Moreover, the drivetrain is mechanically connected to the propulsion supersystem 132. The propulsion supersystem 132 and the drivetrain together serve as an electrified powertrain for the FCV 100. The energy supersystem 130 is operable to perform one or more energy functions, including but not limited to generating electrical energy. The propulsion supersystem 132 is operable to perform one or more propulsion functions using electrical energy from the energy supersystem 130, including but not limited to powering the wheels 114.

Specifically, the energy supersystem 130 is operable to generate electrical energy, store electrical energy, condition and otherwise handle electrical energy, and store and otherwise handle fuel. In conjunction with the drivetrain, the propulsion supersystem 132 is operable to power the wheels 114 using electrical energy from the energy supersystem 130. With the wheels 114 powered, the propulsion supersystem 132 is employable to accelerate the FCV 100, maintain the speed of the FCV 100 (e.g., on level or uphill ground) and otherwise drive the FCV 100 along the ground. The propulsion supersystem 132 is also operable to generate electrical energy using one, some or all of the wheels 114, and consequently retard the wheels 114. With the wheels 114 retarded, the propulsion supersystem 132 is employable to decelerate the FCV 100, maintain the speed of the FCV 100 (e.g., on downhill ground) and otherwise drive the FCV 100 along the ground. The energy supersystem 130, in turn, is operable to store electrical energy from the propulsion supersystem 132. As the combined product of generating electrical energy, and consequently retarding the wheels 114, and storing electrical energy, the propulsion supersystem 132 and the energy supersystem 130 are operable to regeneratively brake the FCV 100 at the wheels 114.

In addition to the energy supersystem 130 and the propulsion supersystem 132, the vehicle systems 120 include one or more auxiliary systems 134. The auxiliary systems 134 include a braking system 140, a steering system 142, a heating/cooling system 144, and an accessory system 146. The auxiliary systems 134, like the propulsion supersystem 132, are electrically connected to the energy supersystem 130. The auxiliary systems 134 are operable to perform one or more auxiliary functions using electrical energy from the energy supersystem 130, including but not limited to frictionally braking the FCV 100, steering the FCV 100, cooling the FCV 100, heating the FCV 100 and one or more accessory functions. Accordingly, although the propulsion supersystem 132 acts as the principal electrical load on the energy supersystem 130, the auxiliary systems 134 act as electrical loads on the energy supersystem 130 as well.

Sensor System

As part of the sensor system 122, the FCV 100 includes one or more onboard sensors. The sensors monitor the FCV 100 in real-time. The sensors, on behalf of the sensor system 122, are operable to detect information about the FCV 100, including information about user requests and information about the operation of the FCV 100. For example, sensor system 122 may monitor the state of charge (SOC) of a battery of battery system 162, and power and temperature of the fuel cell stack and the batteries through constant monitoring of voltages, currents, temperatures associated with/relevant to the fuel cell stack and batteries.

The FCV 100 includes user controls. The user controls serve as interfaces between users of the FCV 100 and the FCV 100 itself, and are operable to receive mechanical, verbal and other user inputs requesting vehicle functions. In conjunction with corresponding user controls, and among the sensors 122, the FCV 100 includes an accelerator pedal sensor, a brake pedal sensor, a steering angle sensor and the like, and one or more selector sensors, one or more microphones, one or more cameras and the like. Relatedly, among information about user requests, the sensor system 122 is operable to detect user inputs requesting powering the wheels 114 (e.g., vis-à-vis the accelerator pedal), user inputs requesting braking, steering and the like, user inputs requesting heating, cooling and the like, as well as user inputs requesting accessory functions.

Also among the sensors 122, the FCV 100 includes one or more speedometers, one or more gyroscopes, one or more accelerometers, one or more wheel sensors, one or more thermometers, one or more inertial measurement units (IMUs), one or more controller area network (CAN) sensors and the like. Relatedly, among information about the operation of the FCV 100, the sensor system 122 is operable to detect the location and motion of the FCV 100, including its speed, acceleration, orientation, rotation, direction and the like, the movement of the wheels 114, temperatures of the FCV 100, and the operational statuses of one, some or all of the vehicle systems 120.

Control Modules

As noted above, the processors 124, the memory 126 and the control modules 128 together serve as one or more computing devices whose control modules 128 orchestrate the operation of the FCV 100. The control modules 128 include a global control module 128G. Relatedly, as part of a central control system, the FCV 100 includes a global control unit (GCU) to which the global control module 128G belongs. Although the FCV 100, as shown, includes one global control module 128G, it will be understood that this disclosure is applicable in principle to otherwise similar vehicles including multiple global control modules 128G. The control modules 128 also include one or more power control modules 128P. Relatedly, the FCV 100 includes one or more power control units (PCUs) to which the power control modules 128P belong. Although the processors 124 and the memory 126 are shown as being common to the GCU and the PCUs, it is contemplated that one, some or all of the GCU and the PCUs could be a standalone computing device with one or more dedicated processors 124 and dedicated memory 126.

The global control module 128G orchestrates the global operation of the FCV 100, including but not limited to the operation of the vehicle systems 120, on behalf of the GCU. The power control modules 128P orchestrate the operation of the energy supersystem 130 and the propulsion supersystem 132, as well as certain auxiliary systems 146, on behalf of the PCUs.

The processors 124 may be any components configured to execute any of the processes described herein or any form of instructions to carry out such processes or cause such processes to be performed. The processors 124 may be implemented with one or more general purpose or special purpose processors. Examples of suitable processors 124 include microprocessors, microcontrollers, digital signal processors or other forms of circuitry that execute software. Other examples of suitable processors 124 include without limitation central processing units (CPUs), array processors, vector processors, digital signal processors (DSPs), field programmable gate arrays (FPGAs), programmable logic arrays (PLAs), application specific integrated circuits (ASICs), programmable logic circuitry or controllers. The processors 124 may include at least one hardware circuit (e.g., an integrated circuit) configured to carry out instructions contained in program code. In arrangements where there are multiple processors 124, the processors 124 may work independently from each other or in combination with one another.

The memory 126 is a non-transitory computer readable medium. The memory 126 may include volatile or nonvolatile memory, or both. Examples of suitable memory 126 includes random access memory (RAM), flash memory, read only memory (ROM), programmable read only memory (PROM), erasable programmable read only memory (EPROM), electrically erasable programmable read only memory (EEPROM), registers, magnetic disks, optical disks, hard drives or any other suitable storage medium, or any combination of these. The memory 126 includes stored instructions in program code. Such instructions are executable by the processors 124 or the control modules 128. The memory 126 may be part of the processors 124 or the control modules 128, or may be communicatively connected the processors 124 or the control modules 128.

Generally speaking, the control modules 128 include instructions that may be executed by the processors 124. The control modules 128 may be implemented as computer readable program code that, when executed by the processors 124, execute one or more of the processes described herein. Such computer readable program code may be stored on the memory 126. The control modules 128 may be part of the processors 124, or may be communicatively connected the processors 124.

Power Modules

As noted above, the vehicle systems 120 are operable to perform vehicle functions on behalf of the FCV 100, and thereby satisfy corresponding vehicle demands on behalf of the FCV 100. Specifically, the energy supersystem 130 is operable to perform energy functions, and thereby satisfy corresponding energy demands, the propulsion supersystem 132 is operable to perform propulsion functions, and thereby satisfy corresponding propulsion demands, and the auxiliary systems 134 are operable to perform auxiliary functions, and thereby satisfy corresponding auxiliary demands.

From the perspective of the global control module 128G and the power control modules 128P, and the orchestration of the global operation of the FCV 100, the vehicle demands include one or more global vehicle demands or, in other words, vehicle demands common to the FCV 100. Specifically, one or more of the energy demands are global energy demands, and one or more of the propulsion demands are global propulsion demands. The global energy demands may include any combination of one or more demands to generate electrical energy, one or more demands to store electrical energy, and one or more demands to store and otherwise handle fuel. The global propulsion demands may include one or more demands to power the wheels 114 and one or more demands to retard the wheels 114. Any combination of the global energy demands and the global propulsion demands may be part of global combined energy and propulsion demands, such as one or more demands to regeneratively brake the FCV 100. Moreover, each auxiliary demand is a global auxiliary demand. The global auxiliary demands may include any combination of one or more demands to frictionally brake the FCV 100, one or more demands to steer the FCV 100, one or more demands to cool the FCV 100, one or more demands to heat the FCV 100 and one or more demands to perform accessory functions.

Beyond being equipped to satisfy the global vehicle demands by performing corresponding vehicle functions, the FCV 100 is equipped to satisfy one or more vehicle demand requirements. Specifically, in relation to being operable to perform vehicle functions, and thereby satisfy corresponding global vehicle demands, the vehicle systems 120 have the capacity to satisfy vehicle demand requirements on behalf of the FCV 100. Accordingly, the energy supersystem 130 has the capacity to satisfy certain energy demand requirements, the propulsion supersystem 132 has the capacity to satisfy certain propulsion demand requirements, and the auxiliary systems 134 have the capacity to satisfy certain auxiliary demand requirements.

Generally speaking, vehicle demand requirements are specific to particular vehicle applications. For example, the FCV 100, as a semi-tractor application, has higher energy demand requirements and higher propulsion demand requirements than many other vehicle applications. In some cases, the FCV 100 could have multiple times the energy demand requirements and multiple times the propulsion demand requirements of other vehicle applications.

FCV 100 may include a power module 150. Although the FCV 100, as shown, includes one power modules 150, it will be understood that this disclosure is applicable in principle to otherwise similar vehicles including two or more power modules 150. In the FCV 100, the energy supersystem 130 and the propulsion supersystem 132 are arranged across the power module 150, with power module 150 including an energy system 152 and a propulsion system 154.

In power module 150, the propulsion system 154 and the energy system 152 are electrically connected to one another. Moreover, the drivetrain is mechanically connected to each propulsion system 154. On behalf of the power module 150, each energy system 152 is operable to perform energy functions with which the energy supersystem 130 is associated, including but not limited to generating electrical energy. Propulsion system 154 is operable to perform propulsion functions with which the propulsion supersystem 132 is associated using electrical energy, including but not limited to powering the wheels 114. Propulsion system 154 is, specifically, operable to perform propulsion functions using electrical energy from the energy system 152 of the power module 150 to which it and the energy system 152 belong.

Energy system 152, and the power module 150 to which it belongs, includes a fuel cell system 160, a battery system 162 and a fuel tank system 164. Propulsion system 154, and the power module 150 to which it belongs, includes a motor system 166. Inside power module 150, the motor system 166 is electrically connected to the fuel cell system 160. Moreover, the battery system 162 and the fuel cell system 160 are electrically connected to one another, and the motor system 166 and the battery system 162 are electrically connected to one another. Moreover, the fuel cell system 160 is fluidly connected to the fuel tank system 164. The fuel cell system 160 is operable to generate electrical energy using electrical energy from the battery system 162 and fuel from the fuel tank system 164. In conjunction with the drivetrain, the motor system 166 is operable to power the wheels 114 using electrical energy from any combination of the fuel cell system 160 and the battery system 162. As alluded to above, electrified vehicles may utilize motors/motor generators. That is, motor system 166 is also operable to generate electrical energy using the wheels 114, and consequently retard the wheels 114. The battery system 162 is operable to store electrical energy from the fuel cell system 160. The battery system 162 is also operable to store electrical energy from the motor system 166, (which is responsible for collecting the energy regenerated from braking). The fuel tank system 164 is operable to store and otherwise handle fuel, including fueling the fuel cell system 160 with fuel.

Although vehicle demand requirements are specific to particular vehicle applications, some vehicle demand requirements are less application-dependent than others. The FCV 100, for instance, even as a semi-tractor application, still has similar auxiliary demand requirements as many other vehicle applications. In the FCV 100, the auxiliary systems 134, rather than having multiple counterpart relationships, are common to the FCV 100. At power module 150, each auxiliary element, either individually or as part of the auxiliary system 134 to which it belongs, as the case may be, is electrically connected to the energy system 152. On behalf of the FCV 100 and the auxiliary system 134 to which it belongs, each auxiliary element is operable to perform auxiliary functions using electrical energy from the energy system 152. Accordingly, in power module 150, although the propulsion system 154 acts as the principal electrical load on the energy system 152, the auxiliary elements act as electrical loads on the energy system 152 as well.

As noted above, the power control modules 128P orchestrate the operation of the energy supersystem 130 and the propulsion supersystem 132, as well as certain auxiliary systems 146. That is, power control module 128P orchestrates the operation of the power module 150, including the operation of the energy system 152 and the operation of the propulsion system 154, as well as the operation of the auxiliary elements.

Energy System and Propulsion System

As noted above, power module 150 includes an energy system 152 and a propulsion system 154. Energy system 152 includes a fuel cell system 160, a battery system 162 and a fuel tank system 164. Inside power module 150, a motor system 166 is electrically connected to the fuel cell system 160 through, e.g., a junction box (not shown). Moreover, the battery system 162 and the fuel cell system 160 are electrically connected to one another through the junction box, and the motor system 166 and the battery system 162 are also electrically connected to one another through the junction box.

Figure 2:
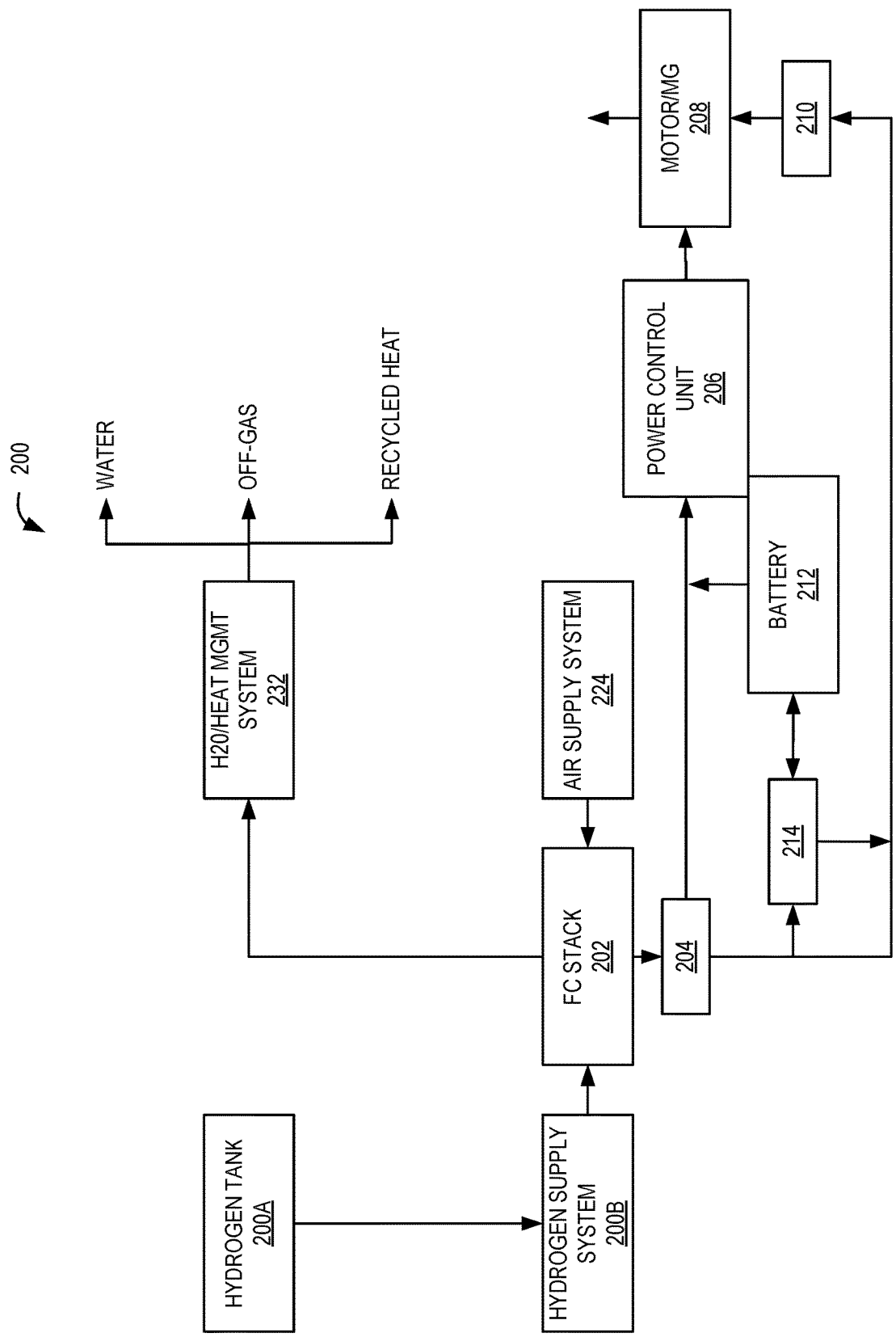
FIG. 2 illustrates an example of a fuel cell system used in the example fuel cell vehicle of FIG. 1

Referring now to FIG. 2, an example schematic representation of an example energy system 200 is illustrated. Example energy system 200 may be one embodiment of energy system 152 of FIG. 1. FCV 100 includes one or more energy elements as part of the fuel cell system 160. Among the energy elements of the fuel cell system 160, the FCV 100 includes a fuel cell stack 202. Although the FCV 100, as shown, includes one fuel cell stack 202 per fuel cell system 160, it will be understood that this disclosure is applicable in principle to otherwise similar vehicles including multiple fuel cell stacks 202 per fuel cell system 160. In relation to the fuel cell stack 202, among the attendant energy elements of the energy system 152, the FCV 100 includes a fuel cell converter 204. The fuel cell converter 204 is electrically connected to the fuel cell stack 202. The fuel cell stack 202 is operable to generate electrical energy. The fuel cell converter 204 is operable to condition electrical energy from the fuel cell stack 202. Specifically, the fuel cell converter 204 is a DC/DC converter operable to convert lower voltage DC electrical energy from the fuel cell stack 202 into higher voltage DC electrical energy. For instance, the lower voltage DC electrical energy may be medium voltage DC electrical energy, and the higher voltage DC electrical energy may be high voltage DC electrical energy.

The FCV 100 also includes one or more propulsion elements as part of the motor system 166. Among the propulsion elements of the motor system 166, the FCV 100 includes a motor 208. Although the FCV 100, as shown, includes one motor 208 per motor system 166, it will be understood that this disclosure is applicable in principle to otherwise similar vehicles including multiple motors 208 per motor system 166. The motor 208 can be a synchronous three-phase AC electric motor. In relation to the motor 208, among the attendant energy elements of the energy system 152, the FCV 100 includes a motor inverter 210. The motor inverter 208 is electrically connected to the fuel cell converter 204 through the junction box, and the motor 208 is electrically connected to the motor inverter 210. Moreover, the drivetrain is mechanically connected to the motor 208. The motor inverter 210 is operable to condition electrical energy from the fuel cell converter 204. Specifically, the motor inverter 210 is operable to convert DC electrical energy from the fuel cell converter 204 into three-phase AC electrical energy. For instance, the three-phase AC electrical energy may be high voltage AC electrical energy. In conjunction with the drivetrain, the motor 208 is operable to power the wheels 114 using electrical energy from the motor inverter 210.

The FCV 100 may also include one or more energy elements as part of the battery system 162. Among the energy elements of the battery system 162, the FCV 100 includes a battery 212. It should be understood that in some embodiments, fuel cell stack 202 may be considered/referred to as a primary energy/power source, while battery 212 is considered/referred to as a secondary batter/energy/power source. In relation to battery 212, among the attendant energy elements of the energy system 152, the FCV 100 includes a battery converter 212. From the perspective of the fuel cell system 160, the battery converter 212 is electrically connected to the fuel cell converter 204 through the junction box, and the battery 212 is electrically connected to the battery converter 214 through the junction box. The battery converter 214 is operable to condition electrical energy from the fuel cell converter 204. Specifically, the battery converter 214 may be a DC/DC converter operable to convert higher voltage DC electrical energy from the fuel cell converter 204 into lower voltage DC electrical energy. For instance, the higher voltage DC electrical energy may be high voltage DC electrical energy, and the lower voltage DC electrical energy may be medium voltage DC electrical energy. The battery 212 is operable to store electrical energy from the battery converter 214.

Also, from the perspective of the battery system 162, the battery converter 2214 is electrically connected to the battery 212 through the junction box, the motor inverter 210 is electrically connected to the battery converter 214 through the junction box, and, as noted above, the motor 208 is electrically connected to the motor inverter 210. Relatedly, the battery converter 214 is also operable to condition electrical energy from the battery 212. Specifically, the battery converter 214 is a DC/DC converter operable to convert lower voltage DC electrical energy from the battery 212 into higher voltage DC electrical energy. For instance, the lower voltage DC electrical energy may be medium voltage DC electrical energy, and the higher voltage DC electrical energy may be high voltage DC electrical energy. The motor inverter 210 is also operable to condition electrical energy from the battery converter 214. Specifically, the motor inverter 210 is operable to convert DC electrical energy from the battery converter 214 into three-phase AC electrical energy. As noted above, the three-phase AC electrical energy may be high voltage AC electrical energy. Once again, in conjunction with the drivetrain, the motor 208 is operable to power the wheels 114 using electrical energy from the motor inverter 210.

Similarly, from the perspective of the motor system 166, the motor inverter 210 is electrically connected to the motor 208, the battery converter 214 is electrically connected to the motor inverter 210 through the junction box, and, as noted above, the battery 212 is electrically connected to the battery converter 214 through the junction box. Relatedly, in conjunction with the drivetrain, the motor 208 is also operable to generate electrical energy using the wheels 114, and consequently retard the wheels 114. Moreover, the motor inverter 210 is also operable to condition electrical energy from the motor 208. Specifically, the 208 inverter 210 is operable to convert three-phase AC electrical energy from the motor 208 into DC electrical energy. For instance, the three-phase AC electrical energy may be high voltage AC electrical energy, and the DC electrical energy may be high voltage DC electrical energy. The battery converter 214 is also operable to condition electrical energy from the motor inverter 210 in the same manner as electrical energy from the fuel cell converter 204. Once again, battery 212 is operable to store electrical energy from the battery converter 214. As the combined product of generating electrical energy, consequently retarding the wheels 114 and storing electrical energy, the motor 208 and battery 212 are operable to regeneratively brake the FCV 100 at the wheels 114.

Among other things, it follows that the motor 208 is operable to power the wheels 114 using electrical energy from any combination of the fuel cell stack 202 and battery 212. Moreover, battery 212 is operable to store electrical energy from the fuel cell stack 202. In a fuel-cell-powered implementation, the motor 208 principally powers the wheels 114 using electrical energy from the fuel cell stack 202. In cases of shortages, the motor 208 powers the wheels 114 using a combination of electrical energy from the fuel cell stack 202 and supplementary electrical energy from battery 212. On the other hand, in cases of surpluses, the motor 208 powers the wheels 114 using some electrical energy from the fuel cell stack 202, and battery 212 may store the remaining electrical energy from the fuel cell stack 202.

As noted above, the FCV 100 includes the fuel cell stack 202 among the energy elements of the fuel cell system 160. Fuel cell stack 202 is fluidly connected to a fuel (in this example, hydrogen) supply system 200B (described in greater detail below) and to a fuel/hydrogen tank 200A (also described in greater detail below). It should be noted that other elements, components, units, such as other inverters, converters, pumps, filters and the like may be used in energy system 200, but are not shown for ease of reference. For example, a pump inverter may be operable to condition electrical energy (DC to three-phase AC) from a power supply unit electrically connected to fuel cell stack 202. For example, a fuel pump is operable to pump fuel from the fuel tank 200A into the fuel cell stack 202.

Also among the energy elements of the fuel cell system 160, the FCV 100 includes an air compressor, filter, and humidifiers, which may be a part of air supply system 224. The air supply system 224 is operable to pump air into the fuel cell stack 202 using electrical energy from a compressor inverter (not shown).

The fuel cell stack 202 includes one or more fuel cells. The fuel cell stack 202 is operable to employ the fuel cells to execute a chemical reaction that combines fuel from a fuel pump (which may be a part of fuel supply system 200B) with oxygen in air from the air supply system 224, and generate electrical energy.

In a hydrogen-fueled implementation, the fuel is hydrogen fuel. In the fuel cell stack 202, each fuel cell includes an anode and a cathode. In each fuel cell, hydrogen fuel (from fuel/hydrogen tank 200A and via fuel/hydrogen supply system 200B) is pumped to the anode where, as part of the chemical reaction, hydrogen molecules are activated by an anode catalyst. The hydrogen molecules thereby release electrons, and become hydrogen ions. The released electrons travel from the anode to the cathode, thereby generating electrical current. The electrical current generated by the fuel cells serves as the electrical energy generated by the fuel cell stack 202. In each fuel cell, the hydrogen ions also travel from the anode to the cathode. Oxygen in air from the air supply system 224 is pumped to the cathode where, as part of the chemical reaction, the hydrogen ions bond with oxygen on a cathode catalyst to generate water. In the hydrogen-fueled implementation, each fuel tank 200A is a high-pressure hydrogen tank operable to store hydrogen fuel.

Several byproducts result from the generation of electrical energy by way of fuel cell stack 202, i.e., water, nitrogen-rich air (also referred to as off-gas), and heat. Accordingly, a water/heat management system 232 may be operatively connected to fuel cell stack 202 to process and contain (or expel) the water/heat (and any off-gas) as needed. For example, water and heat management system 232 may comprise water and coolant loops to element waste heat/water. For example, heat from fuel cell stack 202 may be harvested and used to heat the cabin of FCV 100. Ultimately, electricity produced by fuel cell stack 202 is routed (as described in part above) through power control unit 206 to motor 208, which assistance from battery 212 (as needed) to provide additional power.

In the drivetrain, any penultimate combination of a transmission, a differential, a drive shaft and the like, to which the wheels 114 are mechanically connected, is mechanically connected to some output coupling (not shown) such that the drivetrain is mechanically connected to the motor 208. Again, motor 208 (or other motors/motor-generators if more than one motor is implemented) from fuel cell stack 202 or battery 212. As opposed to the codependent spinning action by motor 208, in the mechanical domain, the wheels 114 are subject to being powered using electrical energy from any combination of the energy systems 152 of the power module 150 to which motor 208 and the energy systems 152 respectively belong. As the product of the wheels 114 spinning the output coupling about a motor axis (not shown), motor 208 is also operable to generate electrical energy using the wheels 114, and consequently retard the wheels 114.

Generally speaking, from the perspective of power module 150, the use of resources is commensurate with the satisfaction of global vehicle demands. One goal of contributorily satisfying global vehicle demands is resource balancing or, in other words, balancing fuel, electrical energy and other resources. Specifically, resource balancing is the product of load balancing or, in other words, balancing electrical and other loads, and load balancing, in turn, is the product of contributorily satisfying global vehicle demands.

Figure 3:
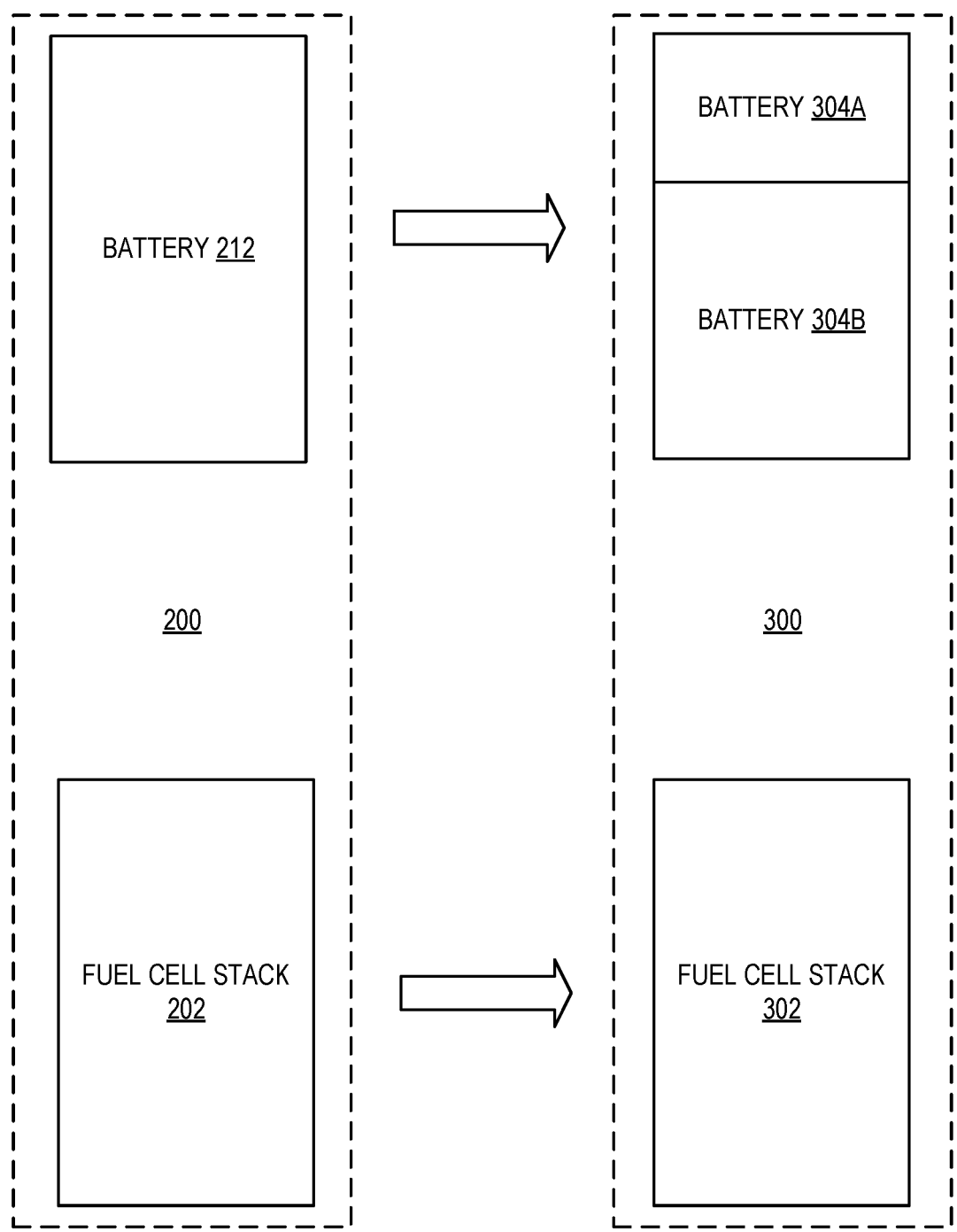
FIG. 3 is a schematic representation comparing a single battery fuel cell system to a dual battery fuel cell system in accordance with one embodiment.

In accordance with various embodiments, a dual battery configuration is provided. FIG. 3 illustrates an schematic example of this shift from a single battery-to-fuel cell configuration to a dual battery-to-fuel cell configuration. That is, while a conventional FCV may have an energy system 200 comprising in part, a single battery 212 and a fuel cell stack 202, in accordance with one embodiment of the present disclosure, an energy system 300 for an FCV may have again, a single fuel cell stack 302, but instead of a single battery, two batteries (Battery A 304A and Battery B 304B).

As alluded to above, and for example, a typical heavy duty truck (HDT) application, the fuel cell system employs a proton electrolyte membrane fuel cell (PEM FC) as a primary energy source for truck traction. A secondary battery (i.e., a single supporting battery) can be used as a power booster in the event greater power than can be delivered via electrical energy from the fuel cell is needed to achieve some desired level of acceleration, for example, or to meet both propulsion system and auxiliary system(s) demands, etc. For example, a semi-tractor used for drayage may be equipped with two 114 kW fuel cell stacks (with a total power of 228 kW), and two 12 kWh power lithium-ion battery packs. In such a conventional architecture, the two fuel cell stacks typically provide driving/motive energy, while each power battery pack provides extra power to when needed, and can recoup energy via regenerative braking as described above. The fuel cell stacks may also be responsible for charging the power battery packs. The weight of such a vehicle is approximately 80,000 lbs, where the total maximum power from the fuel cell stacks and batteries is approximately 500 kW with a driving range of approximately 300 miles.

The size of a fuel cell system including the fuel cell stack and fuel tank (e.g., fuel cell stack 202 and hydrogen tank 200A) tend to be large in size. For example, a typical FC HDT is usually equipped with 228 kW (maximum power) fuel cell stacks. Because maximum power of a fuel cell stack is limited or dictated by the basic electrochemistry used in the fuel cell, increasing maximum power necessitates a corresponding increase in fuel cell capacity using a bigger fuel cell stack. A bigger fuel cell stack is more costly, and occupies a larger volume. Additionally, in order to have high power and a long cycle life, typical power dense batteries are designed to have much less energy density, which translates into the need for much more space to install such power dense batteries.

In accordance with various embodiments, a smaller power dense battery/battery pack, e.g., battery 304A and a larger energy dense battery/battery pack, e.g., battery 304B, may be used to take the place of single battery 212. By maintaining the same or approximately the same space as that taken up by battery 212, the dual battery configuration of batteries 304A and 304B can improve the total battery system utilization efficiency of an FCV, extend driving range, and improve battery cycle life. Such improvements/advantages can also translate into a lowered cost of FCV ownership, and the realization of a better, overall FCV driving experience.

Additionally, three electrical energy storage systems are now implemented, i.e., the fuel cell stack 302, a high power battery 304A, and a high energy battery 304B.

It should be understood that in some embodiments, battery 304A may comprise a battery/have an electrochemical makeup such that battery 304A has and high power density, low energy density, and long life. In general, a "power battery" can be designed to have more/longer cycle life than an "energy battery." This can be accomplished through varying chemical compounds and composition in a battery. Battery 304A can be frequently charged or recharged due to having more power density and longer cycle life than a "energy battery". In some embodiments, charging/recharging battery 304A can be accomplished by harvesting regenerated energy from regenerative braking (described above), or by fuel cells stack 302, or further still, by battery 304B. In this way, battery 304A can be discharged to contribute sustainable power to power module 150/propulsion system 154. It should be understood that battery 304A may also be recharged via plugin charging, e.g., via building mains, external charging unit, and so on.

In contrast, battery 304B may comprise a battery/have an electrochemical makeup such that battery 304B has high energy density. Battery 304B can contribute to power module 150/propulsion system 154 in form of a range extender and also as a sustainable power contributor. It should be understood that like battery 304A, battery 304B may also be recharged via plugin charging, e.g., via building mains, external charging unit, and so on.

For example, in a Class 8 Drayage FC HDT, a power battery pack has a 12 kWh lithium ion battery pack, while occupying a total volume of 350 L of space in the FC HDT. In accordance with various embodiments, the power battery pack can be replaced with two batteries, one energy dense, and one power dense. A commercially available energy lithium ion battery pack which can be used as battery 304B with an energy density of 250 Wh/L will result in 75 kWh of available energy, and has a volume of about 300 L. The power battery, battery 304A, may be the same/similar to the original power battery pack, where energy density is calculated based on the 12 kWh battery pack. Preferably, battery 304A will have a volume of approximately 50 L (given the total volume of available space is 350 L.

Power performance targets may be specified, e.g., such that the dual battery system/architecture is to provide 400 kW in 10 seconds, 350 kW in 30 s, and 200 kW constantly. The dual-battery system may need to release 1.1 kWh and 2.9 kWh energy for 400 kW in 10 seconds, and 350 kW in 30 seconds, respectively. Furthermore, the constant discharge rate of the dual battery system for constantly providing 200 kW power into the requisite vehicle systems is calculated based on a battery's total energy when fully charged.

The maximum battery SOC percentage (SOC %) at various power demand levels can be calculated using an assumption that the battery is used on its own (without any supplementation from another power source). As will be described below, a battery management system or mechanism may be used to balance and optimize the power output from each battery. For instance, the discharge SOC % of both the batteries at a power demand of 350 kW in 30 seconds may exceed a battery's capacity. Moreover, if a battery has a particularly high discharge rate given a constant power demand of 200 kW, the result is that battery 304A would have to jointly provide power using battery 304B.

Moreover, the difference between the total energy of batteries 340A and 340B relative to the original, "base" battery (12 kWh) may present extra energy in the same space or volume in an FCV. The extra energy that the dual-battery system brings to FCV can be, for example, 64.9 kWh, 64.8 kWh and 68.9 kWh based on existing/available batteries that can be used to embody batteries 304A and 304B. Assuming the FCV is an FC HDT with a gross cargo weight of 80,000 lb, the FCV uses 2.25 kWh energy for every 1.0 mile driven. Thus, the extra energy could bring extra driving ranges of 28.8 miles, 28.6 miles, and 30.6 miles in electric mode, respectively, without the need for additional space to contain/house the batteries 304A and 304B.

Figure 4:
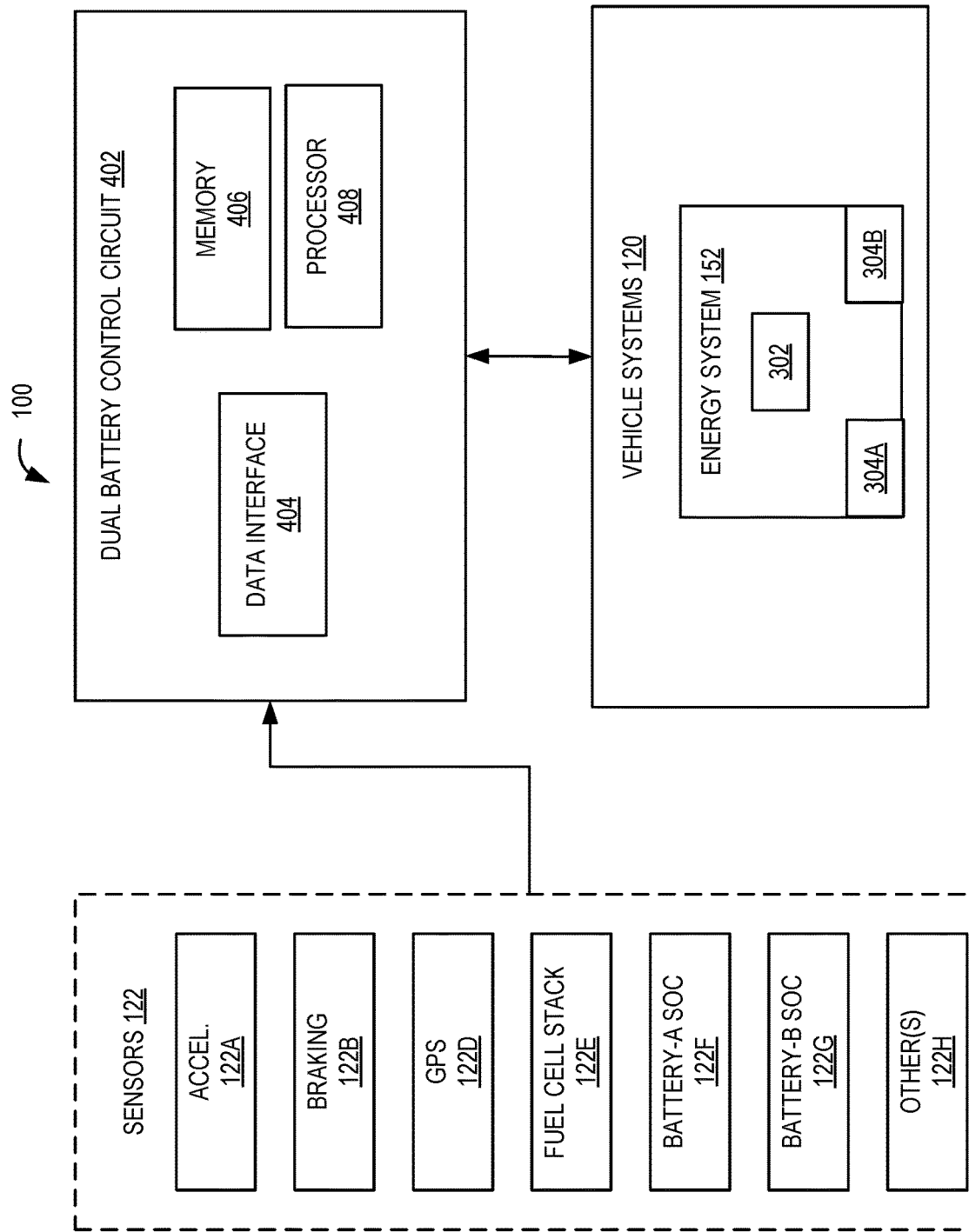
FIG. 4 is a schematic representation of a dual battery fuel cell system in accordance with one embodiment.

FIG. 4 illustrates an example architecture for operating/controlling an FCV 100 in which a hybrid, dual-battery configuration is used. As alluded to above, various sensors 122 may monitor/track/sense information regarding various operative characteristics of FCV 100. As illustrated in FIG. 4, such sensors may include, but are not necessarily limited to, e.g., a sensor to sense acceleration demand 122A, a sensor 122B to sense braking demand, a GPS receiver 122D to detect a current/future/past location or position (which in some embodiments can be translated into road grade information, for example), a sensor 122E to monitor operating state of the fuel cell stack, sensors 122F and 122G to respectively monitor the battery SOCs associated with the two batteries, e.g., batteries 304A and 304B, and other sensors 122H, which may be position sensors, accelerometers, imaging devices (cameras), etc.

That is, sensors 122 may monitor, measure, detect and/or otherwise obtain data regarding various inputs or conditions to the fuel cell stack 302, and various outputs, outcomes or operating states of the fuel cell stack 302/components comprising fuel cell stack 302. The various conditions of the fuel cell stack 302 may include the gas pressure or the water pressure within the cathode/anode, the gas temperature or the water temperature within the cathode/anode, the mol flow rate of the gas or the water within the cathode/anode or the mol fraction of the gas or the water within the anode. Other conditions may include an overall amount of water in the fuel cell stack 302, and a flux or an amount of gas or water transfer between the anode and the cathode. The various gases may include hydrogen, nitrogen and/or oxygen. The various outputs of the fuel cell stack 302 include a voltage and/or a water balance cross-over.

Sensor information from one or more of sensors 122 may be sent to and received by dual battery control circuit 402, which may be an embodiment of or a part of processor 124, global control module 128G, power control module 128P, or energy supersystem 130, or its own dedicated processor/processing system. As illustrated in FIG. 4, dual battery control circuit 402 may comprise a data interface 404, which may be an embodiment of a wireless/wired communications interface through which sensor signals can be received. Memory 406 and processor 408, as noted above, may respectively comprise any form of appropriate GPU, CPU, etc., and flash, RAM, EEPROM, etc.

Sensor data indicating, e.g., the battery SOC of batteries 304A and 304B along with propulsion-related requests or demands via acceleration sensor 122A, etc. may be received by dual battery control circuit 402. Processor 408 may execute instructions stored in memory 406 to determine whether to enable one or more of fuel cell stack 302, battery 304A, or battery 304B depending on the operating conditions/conditions relevant to FCV operation gleaned by sensors 122. Considerations regarding enabling or selecting one or more of fuel cell stack 302, battery 304A, or battery 304B to provide energy/power to support or meet some operational request or demand may be taken into account, and an appropriate energy/power split directive can be implemented.

For example, Table 1 below represents example driving conditions mapped to an appropriate corresponding usage/ suggested use of one or more of fuel cell stack 302, battery 304A, or battery 304B. It should be understood that Table 1 is a non-limiting example of power source-to-conditions mappings. Other conditions and mappings can be considered or taken into account when determining which power source (s) to use given a particular condition (or set of conditions). It should be understood that such conditions need not be considered exclusively or in a singular fashion—rather, various embodiments may consider multiple conditions relevant to power source selection. In accordance with various embodiments, driving conditions can be indicative of or can comprise operating characteristics of an FCV (e.g., rate of acceleration, traveling speed, etc.), as well as environmental characteristics of some roadway(s) or path(s) already traversed, being traversed, or to be traversed that can impact operation of the FCV. For example, past, current, or future traversal of an up/downhill road, a particular navigation path(s) to a particular destination, etc. may have an impact on how propulsion or auxiliary systems of the FCV may operate or be powered.

TABLE 1

| Power Source | Main indicators of Requirement* | Driving Conditions | | | |
|---|---|---|---|---|---|
| | | Grade | Cruise | 0-30 mph** | 0-60 mph** |
| Fuel Cell Stack 302 | High Energy, High Power, Long Life | ✓ | ✓ | ✓ | ✓ |
| Battery 304A | High Power, Long Life | ✱ | ♦ | ✓ | ✓ |
| Battery 304B | High Energy, Moderate Life | ✱ | ✓ | ♦ | ✱ |

*: Safety/cost equally important to listed indicators;
**: accel;
✓ = use;
✱ = assist if needed;
♦ = idle/being charged As shown in Table, 1, power sources, i.e., fuel cell stack 302 (FIG. 3). Battery 304A, a power dense battery, and Battery 304B, a more energy dense battery may be mapped to or associated with certain driving conditions. For example, when driving conditions, e.g., sensed by one or more sensors 122, indicate that the FCV is at least one of traveling on an uphill grade, cruising, accelerating from 0 to 30 mph, or accelerating from 0 to 60 mph, fuel cell stack 302 is always used as a power source for propulsion system 154.

When fuel exists for fuel cell stack 302, battery 304A is used to supplement power provided by fuel cell stack 302 when the FCV is accelerating at the given rates. However, when the FCV is traveling, e.g., up an incline, battery 304A may be used if fuel cell stack 302 is unable to, e.g., provide enough power to propulsion system 154 to meet the torque demands to traverse the incline. When the FCV is in a cruise mode, e.g., the speed of the FCV stays within some threshold speed range/band without exceeding any acceleration thresholds, battery 304A is not used, and may be charged. In a situation, for example, when the FCV is accelerating from a stop/standstill, and the FCV is traversing an uphill grade, based on the mapping set forth in Table 1, battery 304A would be used to provide supplemental power to that provided by fuel cell stack 302 until one or more sensors 122 determine that that 30 mph acceleration threshold has been met, at which point, battery 304A may be "disabled" or simply no longer relied upon for power delivery to propulsion system 154.

Battery 304B may used to provide power assistance to fuel cell stack 302 when the FCV is traveling on a grade as well as if the FCV is accelerating from a standstill/stop through 60 mph. When the FCV is cruising, battery 304B is always used, whereas when the FCV is accelerating from 0 mph to 30 mph, it remains idle or can be charged.

It should be understood that the above mapping and conditions, as well as condition thresholds, can be customized or adapted to particular FCVs, e.g., an FC HDT versus a passenger FCV, the conditions in which an FCV typically is operating, etc. A particular electrochemical makeup of either (or both) batteries, as well as the operating characteristics of fuel cell stack 302 may also be a basis for adjusting the mapping, thresholds, etc. In Table 1, the high energy/high power/long life is useful for all driving conditions. During acceleration events, high power is useful, hence the mapping of battery 304A's use when the FCV accelerates from 0 to 30 mph or from 0 to 60 mph. when the FCV is cruising, however, high power (fast discharge of a high amount of energy) is not needed, and so battery 304A's operating characteristics being high power and long life, battery 304A is not used. When the FCV is cruising, battery 304B, a high energy, moderate life battery is instead leveraged to provide power since cruising does not require large amounts of power to be delivered quickly (as opposed to high acceleration events, for example). In some embodiments, battery SOC of each of batteries 304A and 304B may be a factor taken into account prior to utilizing that particular battery(ies). For example, if battery 304A is below a certain battery SOC threshold for providing power, even if the power source-to-driving conditions mapping indicates use of battery 304A, battery 304A may be prohibited from being used. For example, certain batteries may experience shortened battery life, reduced ability to hold charge, etc. if discharged below a particular SOC level.

Referring back to FIG. 4, it should also be understood that dual battery control circuit 402 may further comprise algorithms for battery management, such that instructions executed by processor 408 may compare respective presetting operation boundaries for the fuel cell stack 302 and the dual batteries 304A/304B, such as fuel cell power limits, battery power limits and battery SOCs as well as temperatures of the fuel cell stack 302 and the dual batteries 304A/304B against state of fuel cell 302 and total power demands to determine when/how to discharge (if and when appropriate) one or both of the batteries. For example, in accordance with one embodiment, dual battery control circuit 402 may determine, based on driving/operating conditions and a power source-to-conditions mapping, what power sources are available for use given the current (or future/upcoming) operating/driving conditions. Based on which power source(s) are to be utilized to meet some total power demand from one or more FCV systems, dual battery control circuit 402 can assess, based on received sensor data, whether or not a selected power source(s) has enough energy to discharge to meet some or all of the total power demand. For example, dual battery control circuit 402 may make power source usage determinations based on some optimal or specified operating window within which the one or more power sources are allowed to be used. If some power source is unable to meet its energy delivery requirements, dual battery control circuit 402 can assess any other available power source (such as battery 304B if battery 304A has no charge left) to determine if it may, given the right conditions, based on some override command/process, etc., be able to provide the needed supplemental power. If not, some form (s) of restricted FCV operation may be initiated. For example, acceleration may be capped to a certain rate, vehicle speed may not be allowed to exceed some restriction threshold, certain auxiliary systems, e.g., air-conditioning systems, may be temporarily blocked from use, limited to level(s) of use, etc.

Referring again to FIG. 4, driving conditions (or other relevant conditions) set forth in Table 1, for example, can be determined via sensors 122. Sensors 122 may comprise sensors that simply relay data/signals to dual battery control circuit 402 to translate, process, analyze, etc., or sensors 102 may have their own processors, and may send data that can be directly used by dual battery control circuit 402. In some embodiments, data interface 404 may receive relevant conditions-related data or information from other information sources, e.g., radio, vehicle-to-infrastructure (V2I), vehicle-to-vehicle (V2V) communications, navigation maps, calculated routes from the FCV itself or some remote navigation source, etc.

Table 1 may be stored as a lookup table, matrix, or other data structure in memory 406 that can be accessed by processor 408 to determine, based on the sensor 122 data/information, what power source(s) to enable. When a determination regarding the appropriate power source(s) to be used, depending on the sensed or otherwise learned conditions, control signals or instructions may be transmitted to energy system 152 to control fuel cell stack 302, battery 304A, or battery 304B to provide the requisite power.

Figure 5:
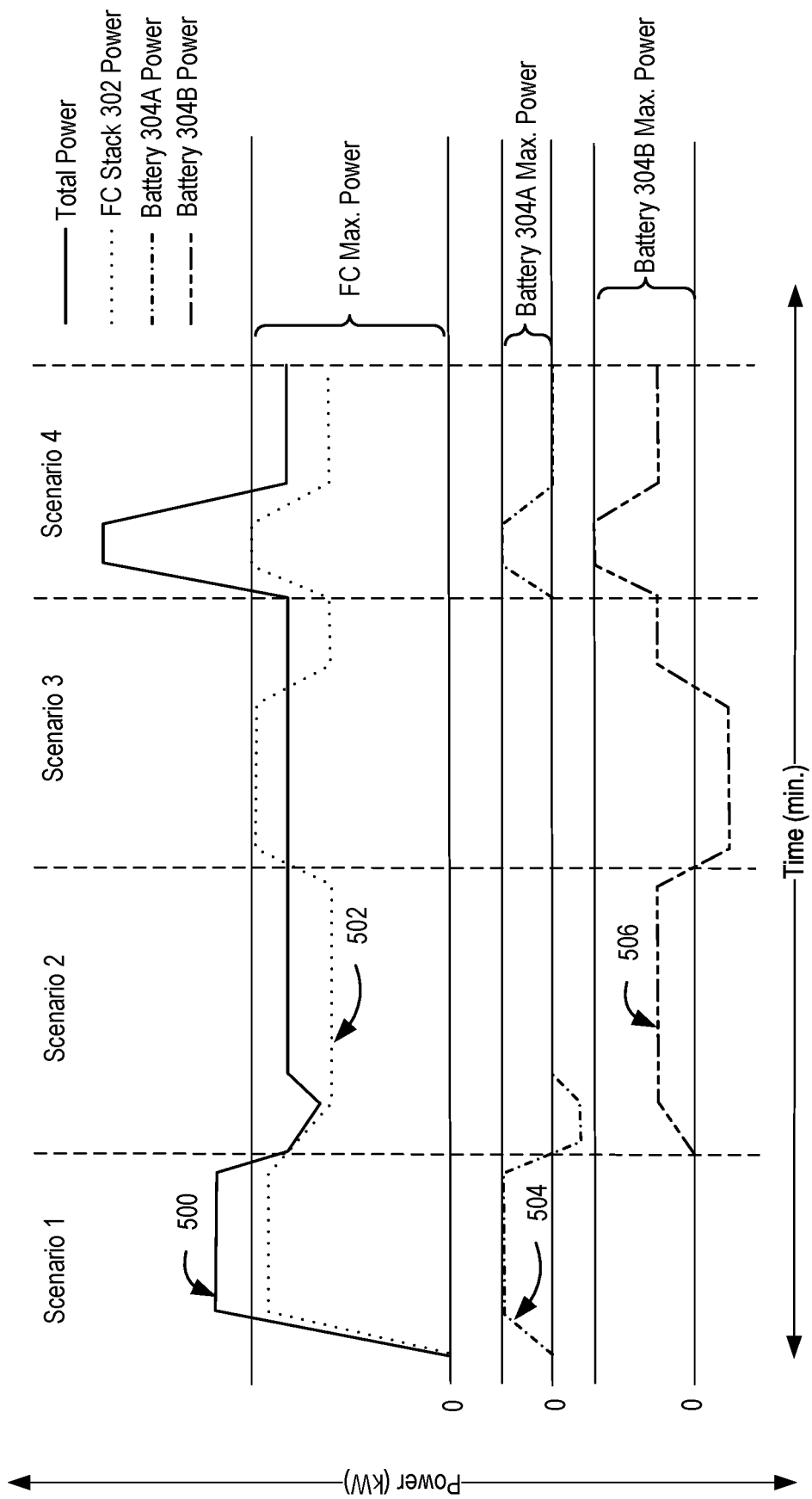
FIG. 5 is a power-time graph representative of an example driving scenario during which the dual battery fuel cell system may be used in accordance with one embodiment.

FIG. 5 illustrates various example scenarios in which different power sources or combinations of power sources may be used to address FCV demands (whether for propulsion/motive purposes or to provide power to one or more auxiliary systems of the FCV). In FIG. 5, power in kW is presented as a function of time in minutes. In example scenario 1, it can be appreciated that fuel cell stack 302 and (power dense) battery 304A are both engaged to provide power to meet a demand load/request. That is, fuel cell stack 302 is operating (502) near it's maximum power threshold. To meet the total power demand 500, battery 304A is enabled to provide supplemental power (504) in addition to that provided by fuel cell stack 302.

In example scenario 2, the FCV's operating conditions are such that the total power demand 500 can be met by fuel cell stack 302 alone as the total power demand 500 amounts to less than fuel cell stack 302's maximum power. As such, fuel cell stack 302 or battery 304B may (separately or together) be used to recharge battery 304A, which as illustrated in FIG. 5, no longer has energy to discharge. This can be indicative of a cruising scenario.

In example scenario 3, it can be appreciated that battery 304B requires recharging while the FCV is driving/in operation. Such a scenario is not necessarily preferred because in this example, energy from fuel cell stack 302 is consumed to recharge battery 304B. It can be appreciated that at this time, battery 304A has not yet been recharged, and it cannot be used to recharge battery 304B. Nevertheless, fuel stack 302 can be used to recharge battery 304B. Alternatively, based on sensors 122, and dual battery control circuit 402 analyzing data regarding, e.g., the amount of remaining fuel, e.g., hydrogen, in the fuel tank 200B, and information from, e.g., the FCV's navigation system or GPS receiver/sensor 122D, can be used assess whether or not enough fuel remains to reach the next refueling station. As can be appreciated, fuel cell stack 302 in during scenario 3, remains below its maximum power limit, and during the latter half of scenario 3, excess energy in fuel cell stack 302 (not used to reach the refueling station) can be used to charge battery 304B. It should be understood that because charging a battery takes a much longer time than re-filling a fuel tank for a fuel cell, it is preferred that extra fuel energy will be used to charge the battery 304B during driving. Of course, the remaining fuel can be estimated to firstly ensure that the vehicle can reach the fuel station.

In example scenario 4 of FIG. 5, battery 304B may contribute more power to energy system 152/200 when the total power demand 500 exceeds the maximum power output of both fuel cell stack 302 and battery 304A. Example scenario 4 or a similar scenario can typically arise at the end of some road grade or during an acceleration event.

Figure 6:
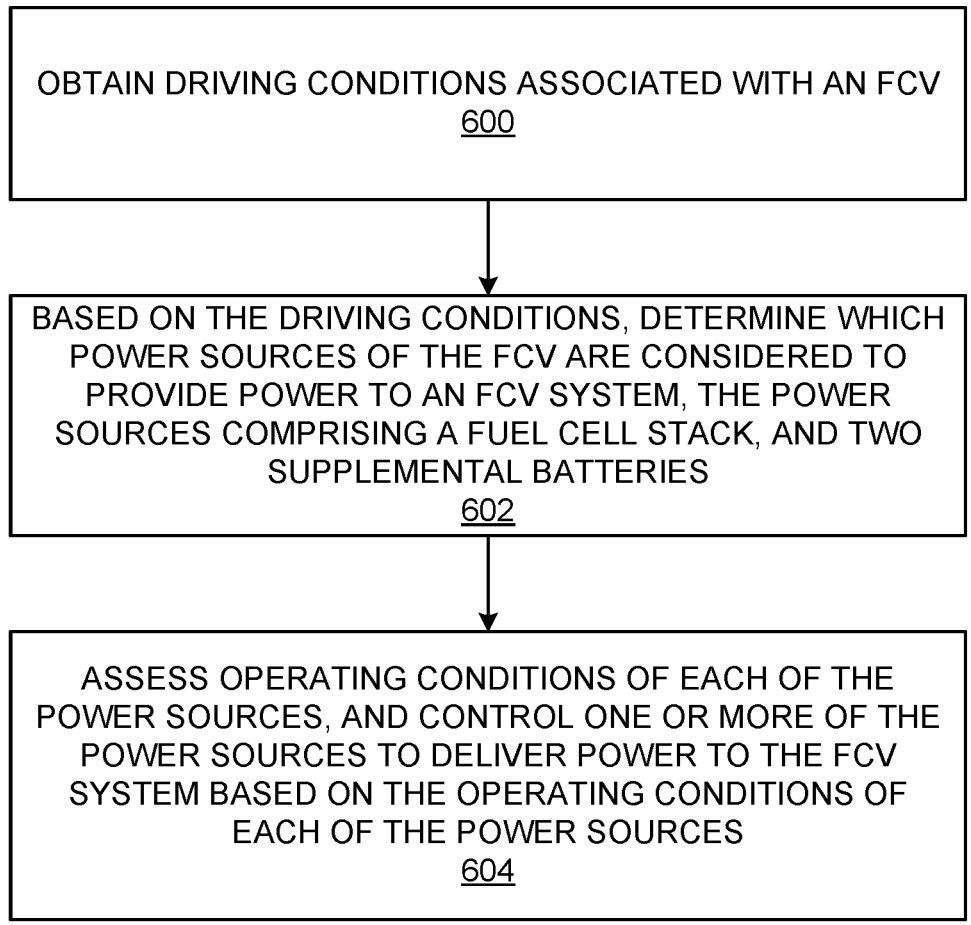
FIG. 6 is a flow chart illustrating operations that may be performed to control a dual battery fuel cell system in accordance with one embodiment.

FIG. 6 is a flow chart illustrating example operations that may be performed to control and selectively use one or more power sources of an FCV including a fuel cell stack and a dual battery support system/architecture to supplement the fuel cell stack. At operation 600, driving conditions associated with an FCV are obtained. As described above, operating conditions can encompass nearly anything, if not all situational characteristics involving or relevant to operation of the FCV. Such driving conditions can include, for example, current speed, road grade, operating mode/state of the FCV (accelerating and at what rate or to what speed, cruising, etc.)

Such conditions may be mapped to an appropriate power source in accordance with a specified mapping, e.g., lookup table or other data structure used to associate a particular power source for use under a certain condition/combination of conditions. Accordingly, at operation 604, based on the driving conditions, which power source(s) of the FCV are considered to provide power to an FCV system, is determined. The power sources comprise a fuel cell stack, and two supplemental batteries. On battery may be a more energy dense battery relative to the other battery which may be a more power dense battery. This energy/power density distinction can be leveraged to specifically target a particular battery based on the anticipated demand load for which the power is being provided. For example, continuous discharging of energy may be addressed by the more energy dense battery, while fast discharge of a lot of energy may be handled by the more power dense battery.

At operation 604, operating conditions of each of the power sources is assessed, one or more of the power sources is controlled to deliver power to the FCV system based on the operating conditions of each of the power sources. That is, driving conditions may be ascertained to determine which power source(s) to use for a particular driving condition/conditions. For example, thresholds, parameters, operating windows, and other operating constraints may be specified for one or more of the fuel cell stack, and each of the batteries. In this way, none of the power sources is made to operate above/beyond its maximum capabilities. When a particular power source is deficient or lacking in the amount of available energy it can discharge to the FCV system(s), the alternative battery may be used (if warranted/allowed).

Figure 7:
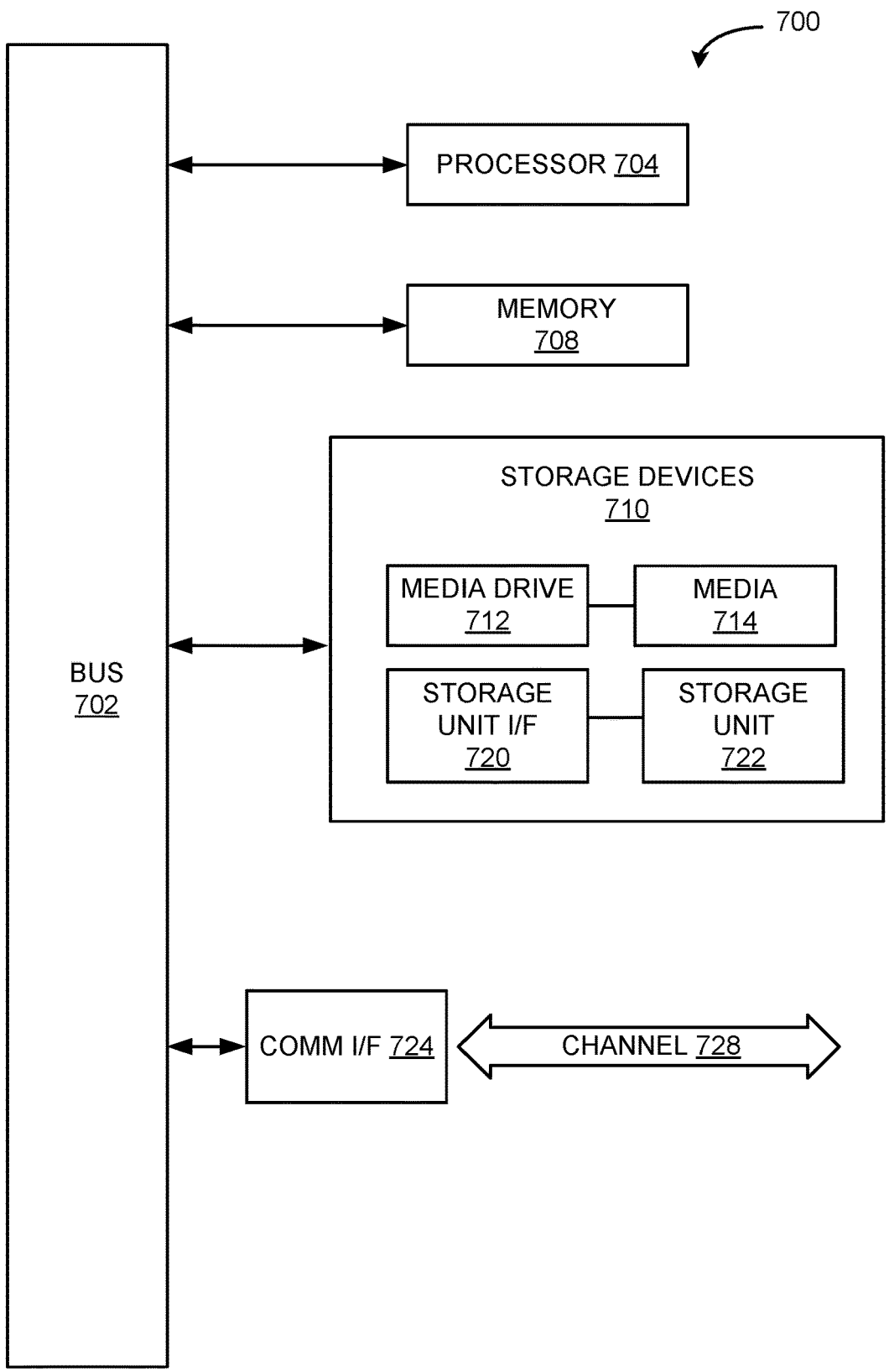
FIG. 7 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 7. Various embodiments are described in terms of this example-computing component 700. After reading this description, it will become apparent to a person skilled in the relevant art how to implement the application using other computing components or architectures.

Referring now to FIG. 7, computing component 700 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 700 might also represent computing capabilities embedded within or otherwise available to a given device. For example, a computing component might be found in other electronic devices such as, for example, portable computing devices, and other electronic devices that might include some form of processing capability.

Computing component 700 might include, for example, one or more processors, controllers, control components, or other processing devices. This can include a processor 704. Processor 704 might be implemented using a general-purpose or special-purpose processing engine such as, for example, a microprocessor, controller, or other control logic. Processor 704 may be connected to a bus 702. However, any communication medium can be used to facilitate interaction with other components of computing component 700 or to communicate externally.

Computing component 700 might also include one or more memory components, simply referred to herein as main memory 708. For example, random access memory (RAM) or other dynamic memory, might be used for storing information and instructions to be executed by processor 704. Main memory 708 might also be used for storing temporary variables or other intermediate information during execution of instructions to be executed by processor 704. Computing component 700 might likewise include a read only memory ("ROM") or other static storage device coupled to bus 702 for storing static information and instructions for processor 704.

The computing component 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid-state drive, a magnetic tape drive, an optical drive, a compact disc (CD) or digital video disc (DVD) drive (R or RW), or other removable or fixed media drive might be provided. Storage media 714 might include, for example, a hard disk, an integrated circuit assembly, magnetic tape, cartridge, optical disk, a CD or DVD. Storage media 714 may be any other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing component 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory component) and memory slot. Other examples may include a PCMCIA slot and card, and other fixed or removable storage units 722 and interfaces 720 that allow software and data to be transferred from storage unit 722 to computing component 700.

Computing component 700 might also include a communications interface 724. Communications interface 724 might be used to allow software and data to be transferred between computing component 700 and external devices. Examples of communications interface 724 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 724 may be carried on signals, which can be electronic, electromagnetic (which includes optical) or other signals capable of being exchanged by a given communications interface 724. These signals might be provided to communications interface 724 via a channel 728. Channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 700 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A fuel cell system of a fuel cell vehicle, comprising:
power sources comprising:
a fuel cell stack;
a first battery comprising a power-dense battery pack; and
a second battery comprising an energy-dense battery pack; and
a control circuit adapted to:
determine a driving condition for the fuel cell vehicle based on at least one of a rate of acceleration for the fuel cell vehicle and a road grade for a road segment traversed by the fuel cell vehicle;
access a driving condition-to-power source mapping to identify which of the power sources are appropriate for powering a propulsion system of the fuel cell vehicle during the determined driving condition, wherein:
when the determined driving condition comprises a first driving condition the driving condition-to-power source mapping maps the first battery and the fuel cell stack to provide power to the propulsion system and maps the second battery to idle or only provide power to the propulsion system when needed,
when the determined driving condition comprises a second driving condition the driving condition-to-power source mapping maps the second battery and the fuel cell stack to provide power to the propulsion system and maps the first battery to idle or only provide power to the propulsion system when needed, and
the first driving condition has at least one of a higher power demand and a lower energy demand than the second driving condition; and
assess operating conditions of each of the power sources, select one or more power sources from the appropriate power sources based on the operating conditions of each of the power sources, and control the one or more power sources to deliver power to the propulsion system.

2. The fuel cell system of claim 1, wherein the operating conditions of the fuel cell stack and the first and second batteries comprise one or more of available energy for discharge to a fuel cell vehicle system, and operating parameters of each of the fuel cell stack and the first and second batteries.

3. The fuel cell system of claim 1, wherein the fuel cell vehicle system further comprises an auxiliary system.

4. The fuel cell system of claim 1, wherein each of the first and second batteries discharge respectively stored energy to supplement deficient energy provided by the fuel cell stack to meet a requested fuel cell vehicle system demand.

5. The fuel cell system of claim 1, wherein each of the first and second batteries are recharged via at least one of regenerative braking performed by the fuel cell vehicle and plugin charging.

6. The fuel cell system of claim 1, wherein the first driving condition comprises a greater rate of acceleration than the second driving condition.

7. The fuel cell system of claim 6, wherein the second driving condition comprises a cruise driving condition.

8. A fuel cell vehicle, comprising:
one or more processors; and
memory operatively connected to the one or more processors, the memory including computer code that when executed by the one or more processors causes the fuel cell vehicle to:
determine a driving condition for the fuel cell vehicle based on at least one of a rate of acceleration for the fuel cell vehicle and a road grade for a road segment traversed by the fuel cell vehicle;
access a driving condition-to-power source mapping to identify which power sources of the fuel cell vehicle are appropriate for powering a propulsion system of the fuel cell vehicle during the determined driving condition, the power sources comprising a fuel cell stack, a first supplemental battery comprising a power-dense battery pack, and a second supplemental battery comprising an energy-dense battery pack, wherein:
when the determined driving condition comprises a first driving condition the driving condition-to-power source mapping maps the first supplemental battery and the fuel cell stack to provide power to the propulsion system and maps the second supplemental battery to idle or only provide power to the propulsion system when needed, when the determined driving condition comprises a second driving condition the driving condition-to-power source mapping maps the second supplemental battery and the fuel cell stack to provide power to the propulsion system and maps the first supplemental battery to idle or only provide power to the propulsion system when needed, and the first driving condition has at least one of a higher power demand and a lower energy demand than the second driving condition; and assess operating conditions of each of the power sources, select one or more power sources from the appropriate power sources based on the operating conditions of each of the power sources, and control the one or more power sources to deliver power to the propulsion system.

9. The fuel cell vehicle of claim 8, wherein the operating conditions of each of the power sources comprise one or more of available energy for discharge to the fuel cell vehicle system, and operating parameters of each of the power sources.

10. The fuel cell vehicle of claim 8, wherein the fuel cell stack comprises a primary power source of the fuel cell vehicle system.

11. The fuel cell vehicle of claim 8, wherein the driving condition-to-power source mapping is based on energy-dense-specific or power-dense-specific needs of the fuel cell vehicle system.

12. The fuel cell vehicle of claim 8, wherein each of the two supplemental batteries discharge respectively stored energy to supplement deficient energy provided by the fuel cell stack to meet a requested fuel cell vehicle system demand.

13. The fuel cell vehicle of claim 8, wherein each of the power sources discharge respectively stored energy to recharge another of the power sources.

14. The fuel cell vehicle of claim 8, wherein the fuel cell vehicle further comprises an auxiliary system.

15. The fuel cell vehicle of claim 8, wherein each of the two supplemental batteries are recharged via at least one of regenerative braking performed by the fuel cell vehicle and plugin charging.

16. The fuel cell system of claim 1, wherein the driving condition-to-power source mapping is based on energy dense-specific or power dense-specific needs of the fuel cell vehicle system.

17. The fuel cell vehicle of claim 8, wherein the fuel cell stack discharges its energy to recharge the second supplemental battery.

18. The fuel cell vehicle of claim 8, wherein the first driving condition comprises a greater rate of acceleration than the second driving condition.

19. The fuel cell vehicle of claim 18, wherein the second driving condition comprises a cruise driving condition.

20. A method comprising:

determining a driving condition for a fuel cell vehicle based on at least one of a rate of acceleration for the fuel cell vehicle and a road grade for a road segment traversed by the fuel cell vehicle;

accessing a driving condition-to-power source mapping to identify which power sources of the fuel cell vehicle are appropriate for powering a propulsion system of the fuel cell vehicle during the determined driving condition, the power sources comprising a fuel cell stack, a first battery comprising a power-dense battery pack, and a second battery comprising an energy dense battery pack, wherein:

when the determined driving condition comprises a first driving condition the driving condition-to-power source mapping maps the first battery and the fuel cell stack to provide power to the propulsion system and maps the second battery to idle or only provide power to the propulsion system when needed, when the determined driving condition comprises a second driving condition the driving condition-to-power source mapping maps the second I battery and the fuel cell stack to provide power to the propulsion system and maps the first battery to idle or only provide power to the propulsion system when needed, and the first driving condition has at least one of a higher power demand and a lower energy demand than the second driving condition; and assessing operating conditions of each of the power sources, selecting one or more power sources from the appropriate power sources based on the operating conditions of each of the power sources, and controlling the one or more power sources to deliver power to the propulsion system.

* * * * *